(12) United States Patent
Yamada et al.

(10) Patent No.: US 8,826,650 B2
(45) Date of Patent: Sep. 9, 2014

(54) EXHAUST GAS TREATMENT METHOD AND DEVICE FOR INTERNAL COMBUSTION ENGINE

(75) Inventors: Satoshi Yamada, Tokyo (JP); Hiroyuki Endo, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 239 days.

(21) Appl. No.: 13/384,843
(22) PCT Filed: Jun. 11, 2010
(86) PCT No.: PCT/JP2010/059938
§ 371 (c)(1),
(2), (4) Date: Apr. 3, 2012
(87) PCT Pub. No.: WO2011/099172
PCT Pub. Date: Aug. 18, 2011

(65) Prior Publication Data

US 2012/0180456 A1    Jul. 19, 2012

(30) Foreign Application Priority Data

Feb. 12, 2010  (JP) ................. 2010-028417

(51) Int. Cl.
| | | |
|---|---|---|
| *F01N 3/00* | (2006.01) | |
| *F01N 3/10* | (2006.01) | |
| *F01N 3/02* | (2006.01) | |
| *F02D 41/14* | (2006.01) | |
| *F04B 49/00* | (2006.01) | |
| *F02D 41/02* | (2006.01) | |
| *B60W 10/30* | (2006.01) | |
| *F01N 3/035* | (2006.01) | |
| *F04B 49/02* | (2006.01) | |
| *F01N 3/023* | (2006.01) | |
| *F01M 1/16* | (2006.01) | |
| *F02D 41/04* | (2006.01) | |
| *F02D 41/08* | (2006.01) | |
| *F02M 25/07* | (2006.01) | |
| *F02D 41/40* | (2006.01) | |

(52) U.S. Cl.
CPC ............... *F01N 3/035* (2013.01); *F02D 41/08* (2013.01); *F02D 2200/023* (2013.01); *Y02T 10/26* (2013.01); *F02D 41/1447* (2013.01); *F04B 49/00* (2013.01); *F02D 41/0245* (2013.01); *F02M 25/0718* (2013.01); *B60W 10/30* (2013.01); *F01N 2510/065* (2013.01); *F02D 2200/101* (2013.01); *F02D 41/025* (2013.01); *F02D 2200/024* (2013.01); *F04B 49/022* (2013.01); *F02M 25/0707* (2013.01); *F02D 2250/11* (2013.01); *F02D 41/405* (2013.01); *F02D 2200/703* (2013.01); *F02D 41/029* (2013.01); *F01N 3/023* (2013.01); *F01M 1/16* (2013.01); *F02D 41/0235* (2013.01); *F02D 41/047* (2013.01); *F02D 2041/026* (2013.01)

USPC .................. 60/295; 60/274; 60/285; 60/300; 60/311

(58) Field of Classification Search
CPC ..... F01N 3/023; F01N 3/0238; F01N 3/0253; F01N 3/103; F01N 3/106; F01N 9/002; F01N 2610/03; F01M 1/16; F01M 1/20; F02D 41/0245; F02D 41/029; F02D 2041/026; F02D 2200/024; B60W 10/30
USPC ............ 60/274, 285, 286, 295, 299, 300, 311
See application file for complete search history.

(56) References Cited

U.S. PATENT DOCUMENTS

| | | |
|---|---|---|
| 4,621,603 A | 11/1986 | Matekunas |
| 2003/0109970 A1* | 6/2003 | Nakamori et al. .............. 701/22 |

(Continued)

FOREIGN PATENT DOCUMENTS

| | | |
|---|---|---|
| DE | 10 2008 037 649 A1 | 3/2009 |
| EP | 1 582 708 A2 | 10/2005 |

(Continued)

OTHER PUBLICATIONS

International Preliminary Report on Patentability and Written Opinion of the International Searching Authority issued Sep. 18, 2012 in corresponding International Application No. PCT/JP2010/059938 (with English translation).

(Continued)

*Primary Examiner* — Kenneth Bomberg
*Assistant Examiner* — Audrey K Bradley
(74) *Attorney, Agent, or Firm* — Wenderoth, Lind & Ponack, LLP

(57) ABSTRACT

An exhaust gas treatment device for preventing a large quantity of unburned HC components from being released to the outside until a diesel oxidation catalyst reaches an activation temperature after early post-injection. By reducing a throttle opening of a variable throttle mechanism (77) provided in an oil passage (72), or increasing a set value of an oil pressure level detected in an oil pressure sensor (78) provided on the downstream side of the variable throttle mechanism, power of an oil circulation pump (74) is increased before a start point $t_1$ of the early post-injection. With this arrangement, by increasing a load of a diesel engine to increase a temperature rise gradient of exhaust gas at the stage of increasing the temperature of the diesel oxidation catalyst, the unburned HC component released until the diesel oxidation catalyst reaches the activation temperature is reduced.

7 Claims, 10 Drawing Sheets

(56) References Cited

U.S. PATENT DOCUMENTS

| | | | |
|---|---|---|---|
| 2005/0155345 A1* | 7/2005 | Nakamura | 60/311 |
| 2005/0217255 A1 | 10/2005 | Aratsuka et al. | |
| 2007/0044453 A1 | 3/2007 | Strauser et al. | |
| 2008/0256928 A1 | 10/2008 | Hunter et al. | |
| 2010/0043403 A1* | 2/2010 | Minamikawa et al. | 60/285 |
| 2011/0120104 A1 | 5/2011 | Masuda et al. | |

FOREIGN PATENT DOCUMENTS

| | | | | |
|---|---|---|---|---|
| EP | 1 983 165 A1 | 10/2008 | | |
| JP | 62-150059 | 7/1987 | | |
| JP | 10-54270 | 2/1998 | | |
| JP | 2005-69148 | 3/2005 | | |
| JP | 2005-351153 | 12/2005 | | |
| JP | 2006-29092 | 2/2006 | | |
| JP | 2006-152870 | 6/2006 | | |
| JP | 2006152870 A * | 6/2006 | | F01N 3/02 |
| JP | 2009-138538 | 6/2009 | | |
| JP | 2009-191654 | 8/2009 | | |
| JP | 2009-264315 | 11/2009 | | |
| WO | WO 2008129781 A1 * | 10/2008 | | F01N 3/02 |

OTHER PUBLICATIONS

Notice of Allowance issued Aug. 28, 2013 in corresponding Korean Application No. 10-2011-7031250 (with English translation).

Extended European Search Report issued Mar. 19, 2013 in corresponding European Application No. 10845764.9.

International Search Report issued Aug. 24, 2010 in International (PCT) Application No. PCT/JP2010/059938.

* cited by examiner

EXHAUST GAS TREATMENT METHOD AND DEVICE FOR INTERNAL COMBUSTION ENGINE

BACKGROUND OF THE INVENTION

1. Technical Field

The present invention relates to an exhaust gas treatment method and device including a diesel oxidation catalyst and a filter for collecting particulate matter in an exhaust gas passage of an internal combustion engine, particularly a diesel engine which is applied to a drive engine for, e.g., a forklift or the like.

2. Description of the Related Art

In emission control for a diesel engine, a reduction in particulate matter (PM, hereinafter referred to as "PM") is as important as a reduction in $NO_x$. As effective means for removing the PM from exhaust gas, there is known PM collection means which uses a filter called a DPF filter (Diesel Particulate Filter).

In a DPF filter, when it is in an operation state with a low exhaust gas temperature, the PM is continuously accumulated in the DPF so that it is necessary to perform forced reconditioning in which the exhaust gas temperature is forcibly increased and the PM is thereby burnt and removed.

The forced reconditioning step is described on the basis of FIGS. 11 and 12. In an exhaust gas passage on the upstream side of the DPF filter, there is provided a diesel oxidation catalyst (DOC).

As shown in FIG. 11, fuel is injected to a combustion cylinder by main injection, and the fuel injected by the main injection is combusted to generate an engine output. After the main injection, the fuel is injected by early post-injection. As shown in FIG. 12, the early post-injection is performed at the start point of the forced reconditioning step $t_1$. The fuel injected by the early post-injection is combusted in a high temperature atmosphere in the combustion cylinder, and the diesel oxidation catalyst is heated to an activation temperature (e.g., 250° C. or more) by heat generated by the combustion.

Next, before the bottom dead center (the point $t_2$ in FIG. 12), the fuel is further injected by late post-injection. The fuel injected by the late post-injection is oxidized by the catalysis of the activated diesel oxidation catalyst, and the temperature of exhaust gas is increased to, e.g., 600° C. or more by reaction heat generated in the oxidation. By increasing the temperature of the exhaust gas to 600° C. or more, the PM collected in the DPF filter is burnt and removed from the DPF filter.

Patent Document 1 discloses an exhaust gas purification device in which a diesel oxidation catalyst and a DPF filter device are provided in an exhaust gas passage of a diesel engine, PM in exhaust gas is collected by the DPF filter device, and the collected PM is subjected to forced reconditioning by the above-described means.

Patent Document 1: Japanese Patent Application Laid-open No. 2006-29092

In such exhaust gas treatment device, as shown in FIG. 12, at the stage of increasing the temperature of the diesel oxidation catalyst, there are cases where a large quantity of unburned HC components are released from a muffler outlet until the diesel oxidation catalyst is heated to the activation temperature or more after the fuel is injected by the early post-injection. That is, when the diesel engine is in a low temperature environment or in a low load operation, the exhaust gas temperature is low.

In such case, a problem arises that it takes time for the diesel oxidation catalyst to be heated to the activation temperature so that a large quantity of unburned HC components are released from the muffler outlet during that period. In particular, when an operator manually performs the forced reconditioning with the diesel engine set in an idling state, the exhaust gas temperature is low so that a large quantity of unburned HC components are released.

SUMMARY OF THE INVENTION

In view of such problem of the conventional art, an object of the present invention is to prevent a large quantity of unburned HC from being released to the outside until a diesel oxidation catalyst reaches an activation temperature after early post-injection in an exhaust gas treatment device in which the diesel oxidation catalyst and a DPF filter are provided in an exhaust gas passage of an internal combustion engine to remove PM in exhaust gas.

1. Means for Solving the Problem

In order to achieve such object, an exhaust gas treatment method for an internal combustion engine of the present invention is an exhaust gas treatment method for an internal combustion engine including a collection step of collecting particulate matter in exhaust gas exhausted from an internal combustion engine by using a filter, and a forced reconditioning step of performing post-injection of fuel to heat the exhaust gas to a combustion temperature of the particulate matter in a diesel oxidation catalyst and then burning and removing the particulate matter collected in the filter by using the heated exhaust gas, the method further including a load increase step of increasing auxiliary power to increase a load of the internal combustion engine before a start of the forced reconditioning step, and an exhaust gas temperature increase step of increasing a temperature rise gradient of the exhaust gas in the forced reconditioning step by using the increased load in order to reduce a quantity of an unburned hydrocarbon released until the diesel oxidation catalyst reaches an activation temperature.

In the method of the present invention, before the start point of the forced reconditioning step of the filter, the auxiliary power of the internal combustion engine is increased and the load of the internal combustion engine is thereby increased. With this arrangement, it is possible to increase a fuel injection quantity of the internal combustion engine to increase the temperature rise gradient of the exhaust gas in the reconditioning step, and hence it is possible to reduce the unburned HC component released until the diesel oxidation catalyst reaches the activation temperature.

Note that, during the normal operation of the internal combustion engine, the load increase step is not performed so that a fuel-efficient operation having reduced auxiliary power is made possible.

In the method of the present invention, the load increase step preferably increases a flow resistance of a lubricating oil by providing a throttle to a lubricating oil passage of the internal combustion engine to thereby increase power of a lubricating oil circulation pump.

With this arrangement, only by making a small modification such as the installation of a variable throttle mechanism or the like to the existing lubricating oil circulation system of the internal combustion engine, the implementation of the method of the present invention is made possible, and the modification cost is low.

In a case where the forced reconditioning step is performed through a manual operation of an operator when the internal combustion engine is in a low-load operation state including an idling state, by performing the forced reconditioning step by the method of the present invention, it is possible to reduce the release of the unburned HC component.

An exhaust gas treatment device for an internal combustion engine of the present invention which can be directly used in the implementation of the method of the present invention is an exhaust gas treatment device for an internal combustion engine which includes a diesel oxidation catalyst and a filter in an exhaust gas passage of the internal combustion engine, the exhaust gas treatment device being configured to collect particulate matter in exhaust gas by the filter, and perform post-injection of fuel to heat the exhaust gas to a combustion temperature of the particulate matter in the diesel oxidation catalyst, and then burn and remove the particulate matter collected in the filter by using the heated exhaust gas, the exhaust gas treatment device including a load increase unit which increases auxiliary power to increase a load of the internal combustion engine, and a controller which controls the load increase unit, wherein the auxiliary power is increased by controlling the load increase unit by using the controller before a start of the post-injection, and the load of the internal combustion engine is thereby increased.

In the device of the present invention, by increasing the load of the internal combustion engine before the start of the post-injection (the start point of the forced reconditioning step), the temperature rise gradient of the exhaust gas in the forced reconditioning step is increased, whereby it is possible to reduce the quantity of the unburned hydrocarbon released until the diesel oxidation catalyst reaches the activation temperature. In addition, during the normal operation of the internal combustion engine, the fuel-efficient operation having reduced auxiliary power is made possible.

In the device of the present invention, the load increase unit preferably includes a variable throttle mechanism provided in a lubricating oil passage of the internal combustion engine and an oil pressure sensor provided in the lubricating oil passage on a downstream side of the variable throttle mechanism, and the controller preferably increases power of a lubricating oil circulation pump so as to maintain an oil pressure level detected by the oil pressure sensor at a level not less than a set value while reducing an opening of the lubricating oil passage using the variable throttle mechanism to increase a flow resistance of a lubricating oil.

With this arrangement, it is sufficient to merely make a small modification such as the installation of the variable throttle mechanism and the oil pressure sensor to the existing lubricating oil circulation system of the internal combustion engine so that the modification cost is low.

In the device of the present invention, the set value of the oil pressure level detected in the oil pressure sensor may be appropriately maintained at an oil pressure level when the opening of the lubricating oil passage is not reduced. With this arrangement, without changing the oil pressure level, when the internal combustion engine has a proper load while a throttle opening of the variable throttle mechanism is reduced, the throttle opening may be fixed. As a result, the selection of the throttle opening by the controller is facilitated.

When this operation is performed, as the variable throttle mechanism, a variable throttle mechanism having a simple structure only capable of two-step opening control can be used so that the cost is low.

The device of the present invention preferably includes an oil temperature sensor which detects a temperature of the lubricating oil in the lubricating oil passage, and the controller preferably changes the set value of the oil pressure level in accordance with a detected value of the oil temperature sensor, or adjusts a throttle opening of the variable throttle mechanism in accordance with the detected value of the oil temperature sensor.

In the lubricating oil, viscosity differs according to the oil temperature and, when the viscosity differs, the flow resistance differs. When the internal combustion engine is in a low temperature environment, the viscosity of the lubricating oil increases, the flow resistance increases, and the oil pressure increases. As a result, in the low temperature environment, it is necessary to increase the set oil pressure level to a level higher than a normal level to increase the load of the internal combustion engine. In a high temperature environment, conversely, even when the set oil pressure level is reduced, it is possible to increase the load of the internal combustion engine.

Instead of adjusting the set oil pressure level according to the oil temperature of the lubricating oil, the throttle opening of the lubricating oil passage of the variable throttle mechanism may be adjusted. Thus, by adjusting the set oil pressure level or the throttle opening of the lubricating oil passage according to the oil temperature of the lubricating oil, the load of the internal combustion engine is set to the proper load, whereby it is possible to increase the temperature rise gradient of the diesel oxidation catalyst at the stage of increasing the temperature of the diesel oxidation catalyst to suppress the release of the unburned HC component.

In the device of the present invention, the controller preferably determines a space velocity (exhaust gas flow quantity $(m^3/h)$/filled diesel oxidation catalyst volume $(m^3)$) of the exhaust gas passing through the diesel oxidation catalyst, estimates an exit exhaust gas temperature of the diesel oxidation catalyst from the space velocity and a reaction rate of the diesel oxidation catalyst, and compares an estimated value with the exit exhaust gas temperature to determine a degradation degree of the diesel oxidation catalyst.

Aging degradation occurs in the diesel oxidation catalyst, and an oxidation function thereof is degraded by the aging degradation so that it becomes impossible to heat the exhaust gas to the initial temperature. Consequently, when the diesel oxidation catalyst is degraded, it is necessary to increase the temperature of the exhaust gas flowing into the diesel oxidation catalyst, increase the set oil pressure level detected in the oil pressure sensor, or reduce the throttle opening of the lubricating oil passage.

The space velocity of the exhaust gas is correlated with the exhaust gas temperature on the downstream side of the diesel oxidation catalyst. When the space velocity of the exhaust gas is reduced, the temperature rise rate of the exhaust gas on the downstream side of the diesel oxidation catalyst is increased, and the difference in the temperature of the exhaust gas on the upstream side and the downstream side of the diesel oxidation catalyst is increased. On the other hand, when the space velocity of the exhaust gas is increased, the temperature rise rate of the exhaust gas on the downstream side of the diesel oxidation catalyst is reduced, and the difference in the temperature of the exhaust gas on the upstream side and the downstream side of the diesel oxidation catalyst is reduced.

Similarly, the reaction rate of the diesel oxidation catalyst is correlated with the exhaust gas temperature on the downstream side of the diesel oxidation catalyst. When the reaction rate of the diesel oxidation catalyst is high, the temperature rise rate of the exhaust gas on the downstream side of the diesel oxidation catalyst is increased, and the difference in the temperature of the exhaust gas between the upstream side and the downstream side of the diesel oxidation catalyst is increased. On the other hand, when the reaction rate of the diesel oxidation catalyst is low, the temperature rise rate of the exhaust gas on the downstream side of the diesel oxidation catalyst is reduced, and the difference in the temperature of the exhaust gas between the upstream side and the downstream side of the diesel oxidation catalyst is reduced.

Therefore, from the space velocity of the diesel oxidation catalyst and the known reaction rate before the degradation, it is possible to estimate the temperature of the exhaust gas on the downstream side of the diesel oxidation catalyst before the degradation. When the actually measured temperature is lower than the estimated temperature, aging degradation is considered to be occurring in the diesel oxidation catalyst, and hence it is possible to judge the aging degradation degree of the diesel oxidation catalyst by comparing the estimated temperature with the actually measured temperature.

Thus, on the basis of the difference between the estimated temperature and the actually measured temperature, it is possible to determine the aging degradation degree of the diesel oxidation catalyst. Accordingly, by increasing the auxiliary power in accordance with the judged aging degradation degree, it is possible to increase the temperature rise gradient of the diesel oxidation catalyst at the stage of increasing the temperature of the diesel oxidation catalyst to suppress the release quantity of the unburned HC component.

In the device of the present invention, the controller preferably judges a degradation degree of the lubricating oil from an air temperature, an atmospheric pressure, a rotation speed, a load, and an operation time of the internal combustion engine, and a total time spent on the burning and removing of the particulate matter collected in the filter, and increases the power of the lubricating oil circulation pump in accordance with the judged degradation degree of the lubricating oil.

A part of the fuel by late post-injection adheres to an inner wall of a cylinder, scraped off by a piston ring when a piston moves downward, and reaches an oil pan. When the fuel is mixed into the lubricating oil in the oil pan, a phenomenon in which the lubricating oil is diluted, i.e., what is called oil dilution occurs. As the oil dilution progresses, the viscosity of the lubricating oil is reduced and the lubricity thereof is reduced. In addition, the lubricating oil quantity is increased so that a problem such as gushing of the lubricating oil or the like occurs.

When such oil dilution or thermal degradation of the lubricating oil progresses, the viscosity of the lubricating oil is reduced, and the oil pressure flowing in the lubricating oil passage is also reduced. In this case, even when the lubricating oil flowing in the lubricating oil passage is throttled, there is a possibility that the set oil pressure level is not achieved.

Therefore, from the total time spent on the reconditioning of a DPF filter, the degree of the reduction in viscosity due to the oil dilution is calculated. In addition, the temperature and pressure of sucked air supplied to a combustion cylinder are calculated from the air temperature and the atmospheric pressure and, from the calculated values, the rotation speed, the load, and the operation time of the internal combustion engine, the thermal degradation degree of the lubricating oil is calculated.

By adjusting the power of the lubricating oil circulation pump in accordance with the calculated degree of the reduction in viscosity and thermal degradation degree of the lubricating oil, it is possible to increase the temperature rise gradient of the diesel oxidation catalyst at the stage of increasing the temperature of the diesel oxidation catalyst to suppress the release of the unburned HC component.

In addition to the above-described structure, the device of the present invention preferably further includes a sensor which detects a replacement timing of the lubricating oil, and the controller preferably resets the degradation degree of the lubricating oil when the replacement timing of the lubricating oil is detected by the sensor.

At the point when the lubricating oil of the internal combustion engine is replaced, the degradation degree of the lubricating oil is reset. Consequently, by resetting the degradation degree of the lubricating oil by using the controller when the replacement timing of the lubricating oil is detected by the sensor and the lubricating oil is replaced, it is possible to set the power of the lubricating oil circulation pump to an optimum value suitable for the property of the lubricating oil. With this arrangement, it is possible to increase the temperature rise gradient of the diesel oxidation catalyst at the stage of increasing the temperature of the diesel oxidation catalyst to suppress the release of the unburned HC component.

2. Effects of the Invention

According to the method of the present invention, since the exhaust gas treatment method for an internal combustion engine includes the collection step of collecting the particulate matter in the exhaust gas exhausted from the internal combustion engine by using the filter, and the forced reconditioning step of performing the post-injection of the fuel to heat the exhaust gas to the combustion temperature of the particulate matter in the diesel oxidation catalyst and then burning and removing the particulate matter collected in the filter by using the heated exhaust gas, and further includes the load increase step of increasing the auxiliary power to increase the load of the internal combustion engine before the start of the forced reconditioning step, and the exhaust gas temperature increase step of increasing the temperature rise gradient of the exhaust gas in the forced reconditioning step by using the increased load in order to reduce the quantity of the unburned hydrocarbon released until the diesel oxidation catalyst reaches the activation temperature, it is possible to increase the temperature rise gradient of the exhaust gas in the reconditioning step to reduce the unburned HC component released until the diesel oxidation catalyst reaches the activation temperature and, since the load increase step is not performed during the normal operation of the internal combustion engine, the fuel-efficient operation having reduced auxiliary power is made possible.

According to the device of the present invention, since the exhaust gas treatment device for an internal combustion engine includes the diesel oxidation catalyst and the filter in the exhaust gas passage of the internal combustion engine, is configured to collect the particulate matter in the exhaust gas by the filter, perform the post-injection of the fuel to heat the exhaust gas to the combustion temperature of the particulate matter in the diesel oxidation catalyst and then burn and remove the particulate matter collected in the filter by using the heated exhaust gas, and further includes the load increase unit which increases the auxiliary power to increase the load of the internal combustion engine and the controller which controls the load increase unit, wherein the auxiliary power is increased by controlling the load increase unit by using the controller before the start of the post-injection and the load of the internal combustion engine is thereby increased, it is possible to obtain the operation and effect similar to those of the method of the present invention.

DETAILED DESCRIPTION OF THE INVENTION

Figure 1:
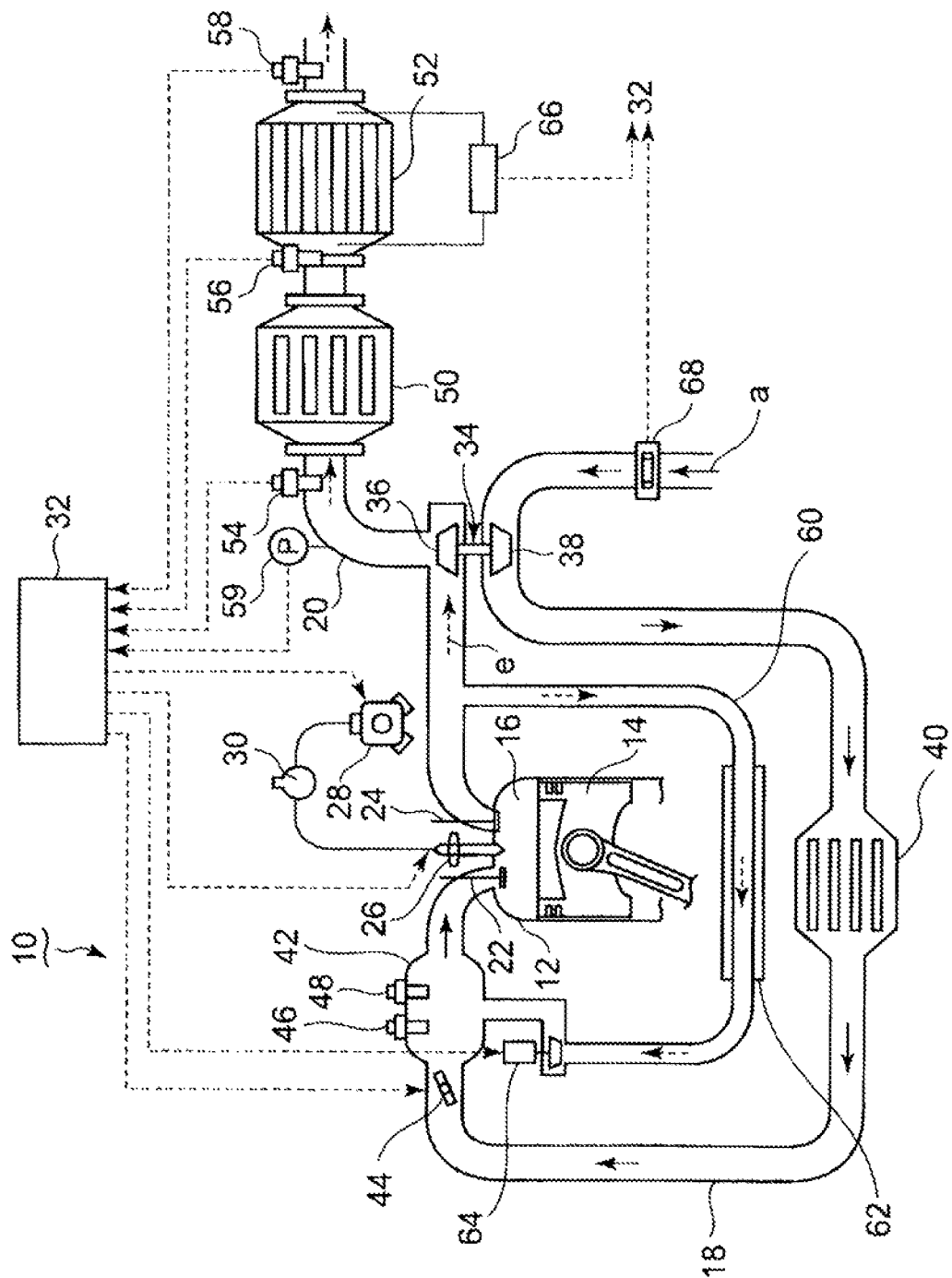
FIG. 1 is a system view of a diesel engine according to a first embodiment of a method and device of the present invention.

A detailed description is given hereinbelow of the present invention by using embodiments shown in the drawings. Note that the scope of the present invention is not limited only to dimensions, materials, shapes, and relative arrangements of constituent parts described in the embodiments unless specifically described.

First Embodiment

Figure 2:
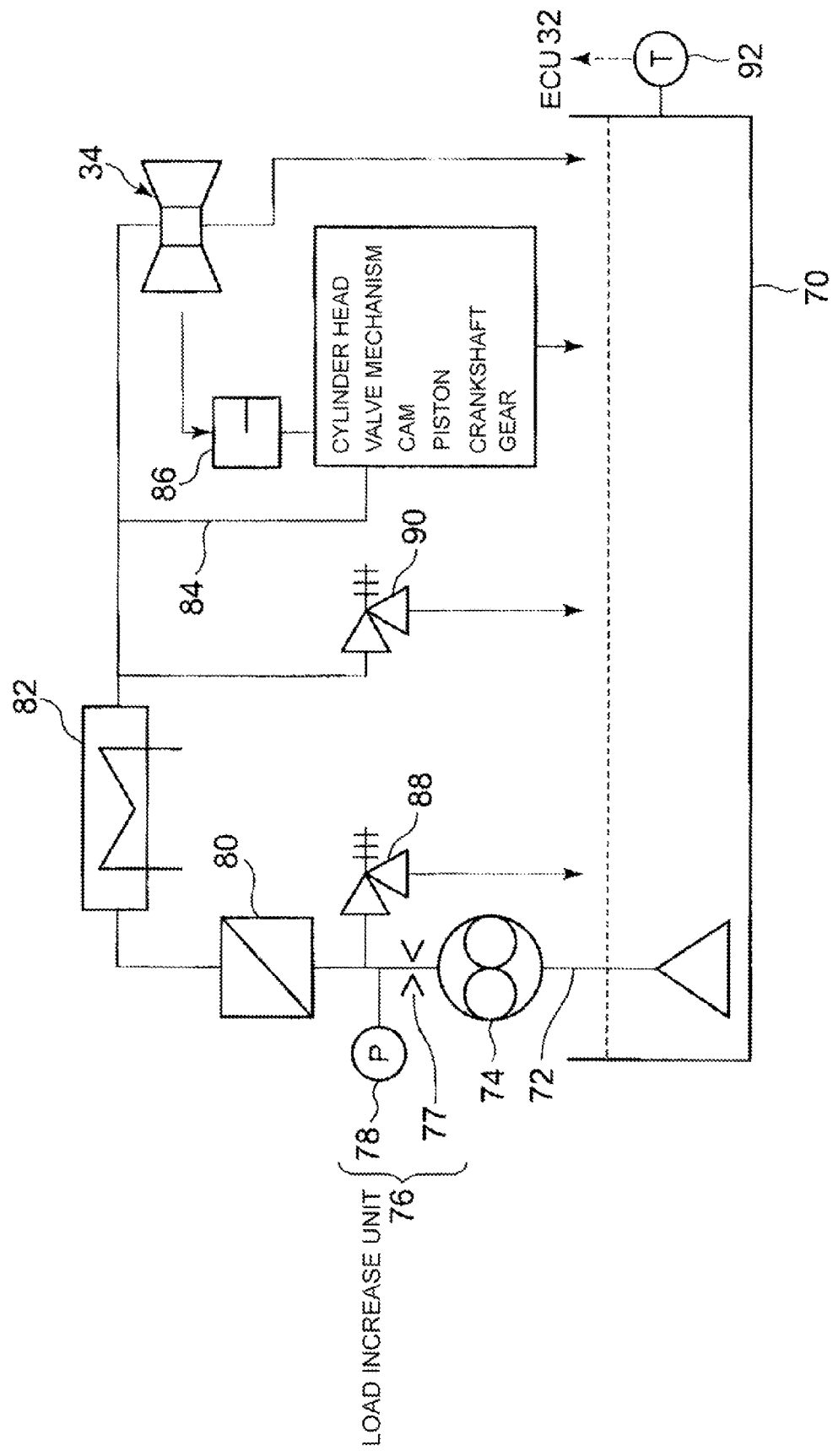
FIG. 2 is a system view showing a circulation system of a lubricating oil of the diesel engine.
Figure 3:
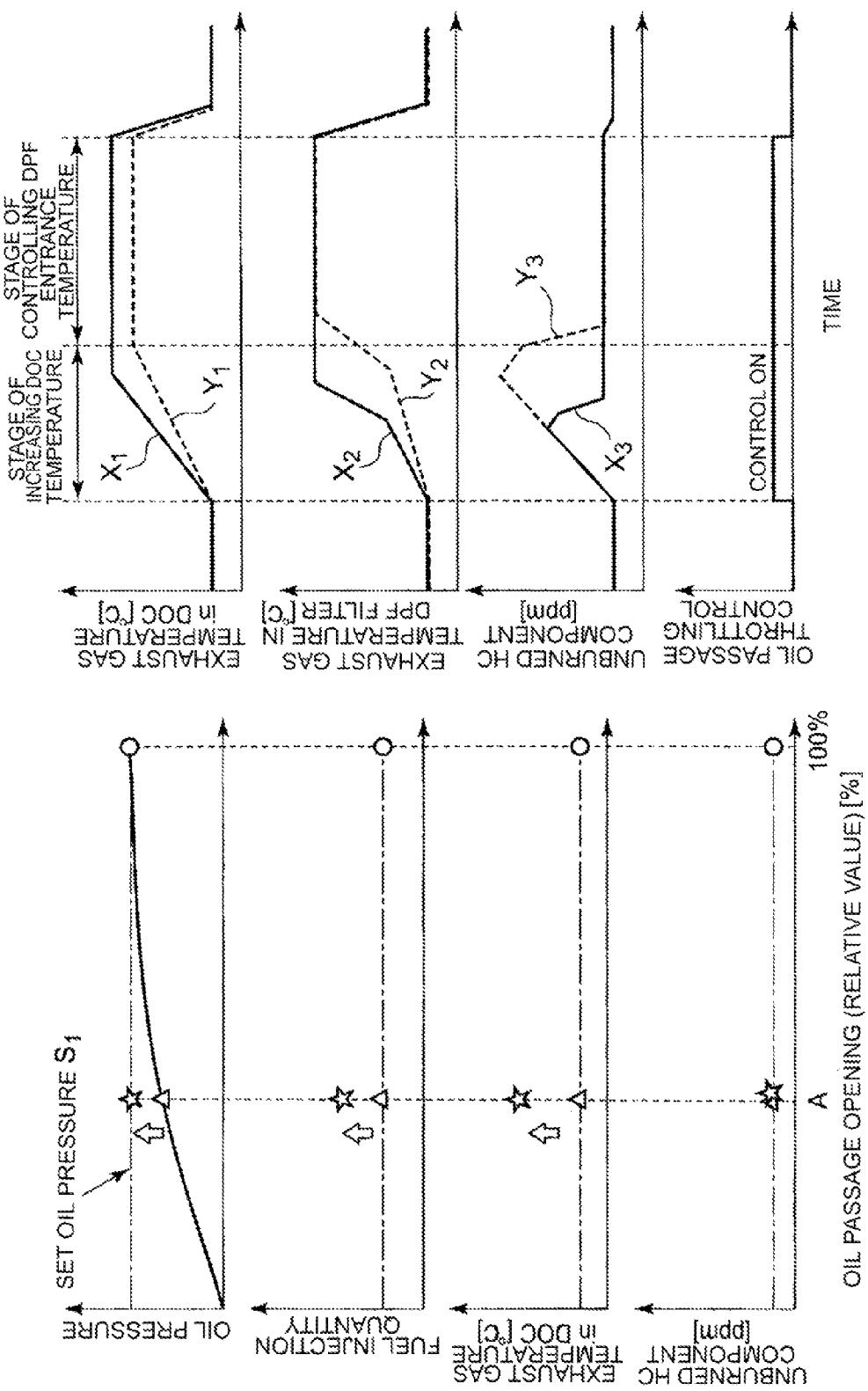
FIG. 3 is a diagram showing the procedure of release suppression of an unburned HC component of the first embodiment.

A description is given of a first embodiment in which a method and device of the present invention are applied to a diesel engine mounted on, e.g., a forklift or the like on the basis of FIGS. 1 to 3. In FIG. 1, a piston 14 is provided inside a combustion cylinder 12 of a diesel engine 10, and a combustion chamber 16 is formed above the piston 14. An intake pipe 18 and an exhaust pipe 20 are connected to a cylinder head of the combustion cylinder 12, and an intake valve 22 and an exhaust valve 24 are provided at connection portions thereof.

In addition, at the center of the upper portion of the cylinder head, there is provided an injector 26 for injecting fuel into the combustion chamber 16. To the injector 26, the fuel such as light oil and heavy oil is supplied at high pressure from an injector pump 28 via a common rail (pressure accumulator) 30, and the fuel is injected into the combustion chamber 16. The injection timing and the injection quantity of the fuel is precisely controlled by an ECU 32. The injected fuel is mixed with air supplied from the intake pipe 18, and the fuel-air mixture is compressed, ignited, and combusted in the combustion chamber 16.

The diesel engine 10 internally includes an exhaust turbocharger 34 consisting of an exhaust turbine 36 disposed in the exhaust pipe 20 and a compressor 38 which is disposed in the intake pipe 18 and driven coaxially with the exhaust turbine 36. Air a discharged from the compressor 38 of the exhaust turbocharger 34 passes through the intake pipe 18, is cooled in an intercooler 40, and then enters into an intake chamber 42. On the entrance side of the intake chamber 42, there is provided a throttle valve 44 for controlling the opening of the intake pipe 18. In addition, in the intake chamber 42, there are provided a sucked air pressure sensor 46 and a sucked air temperature sensor 48.

In the exhaust pipe 20 on the downstream side of the exhaust turbine 36, there are provided a diesel oxidation catalyst 50 and a DPF filter device 52 on the downstream side of the diesel oxidation catalyst 50. Combustion gas combusted in the combustion chamber 16, i.e., exhaust gas e is discharged into the exhaust pipe 20, and drives the exhaust turbine 36 of the exhaust turbocharger 34 to serve as a power source for the compressor 38. Thereafter, the exhaust gas e passes through the diesel oxidation catalyst 50 and the DPF filter device 52, and PM contained in the exhaust gas e is collected by the DPF filter device 52. The exhaust gas e of which the PM is removed in the DPF filter device 52 is discharged to the outside from a muffler outlet which is not shown.

Note that exhaust gas temperature sensors 54, 56, and 58 each for detecting the temperature of the exhaust gas e are provided at the entrance side of the diesel oxidation catalyst 50, and the entrance and exit sides of the DPF filter device 52 in the exhaust pipe 20. In addition, an exhaust gas pressure sensor 59 for detecting the pressure of the exhaust gas e is provided at the entrance side of the diesel oxidation catalyst 50 in the exhaust pipe 20. Further, there are provided a pressure difference sensor 66 for detecting the difference in the pressure of the exhaust gas e between the entrance and the exit of the DPF filter device 52, and a sucked air flow quantity meter 68 at the entrance portion of the intake pipe 18.

Between the intake pipe 18 and the exhaust pipe 20, an EGR pipe 60 is connected. In the EGR pipe 60, there are provided an EGR cooler 62 and an EGR valve 64 for controlling the opening of the EGR pipe 60. A part of the exhaust gas e passes through the EGR pipe 60, is cooled in the EGR cooler 62, and is then returned to the intake chamber 42. With this arrangement, an oxygen quantity in the sucked air is reduced, a combustion temperature at its peak is lowered, and the generation of $NO_x$ is suppressed.

The detected values of the exhaust gas temperature sensors 54, 56, and 58, the exhaust gas pressure sensor 59, the pressure difference sensor 66, and the sucked air flow quantity meter 68 are sent to the ECU 32 and, based on these detected values, the ECU 32 controls the injector 26, the injector pump 28, the throttle valve 44, and the EGR valve 64.

Figure 11:
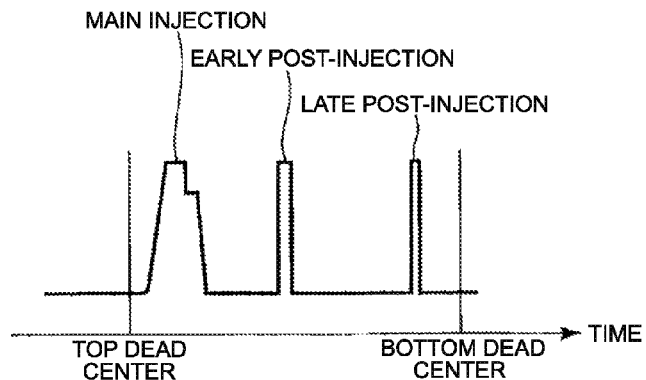
FIG. 11 is a diagram showing a fuel injection step of the diesel engine.
Figure 12:
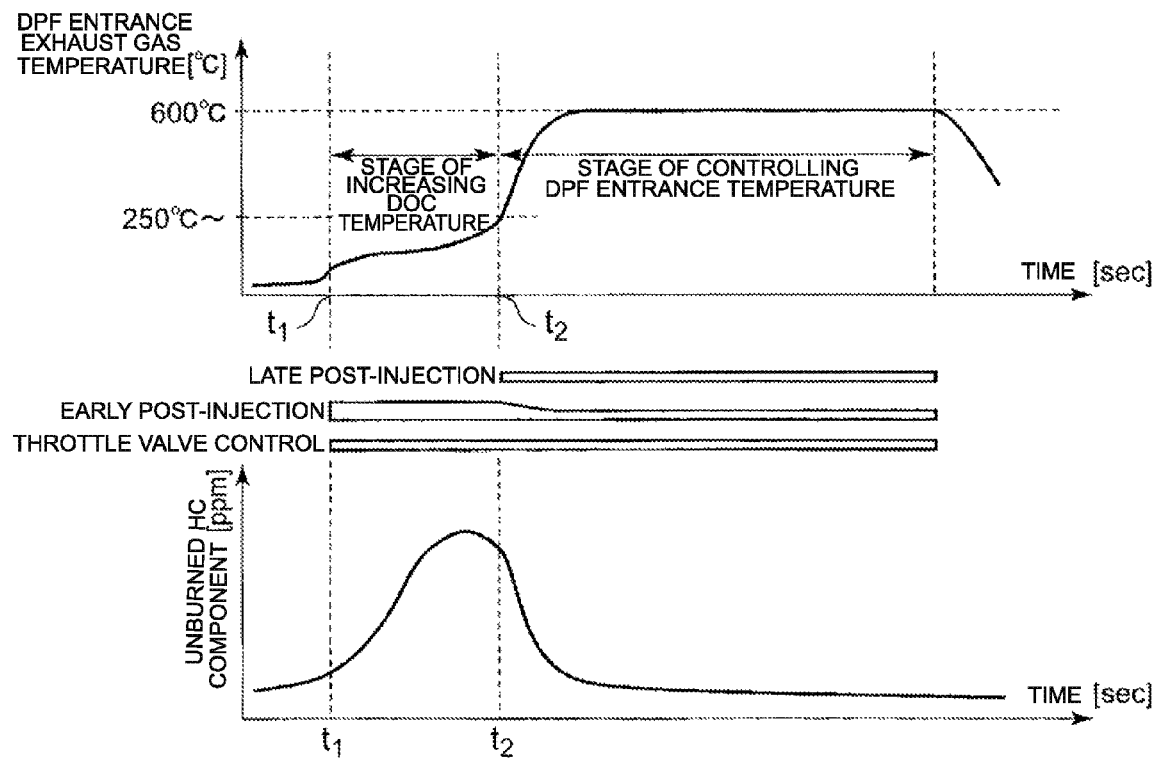
FIG. 12 is a diagram showing a reconditioning step of a DPF filter of the diesel engine.

A forced reconditioning step of burning and removing the PM collected in the DPF filter device 52 is automatically performed according to the following procedure by the ECU 32 which operates the injector 26, the injector pump 28, and the throttle valve 44. As shown in FIG. 11, after the fuel is injected into the combustion chamber 16 by main injection, the fuel is injected by early post-injection at a start point of the forced reconditioning step $t_1$. The fuel injected by the early post-injection is combusted at the temperature of the combustion chamber 16 and, as shown in FIG. 12, at the stage of increasing the temperature of the diesel oxidation catalyst, the diesel oxidation catalyst 50 is heated to an activation temperature of 250° C. or more.

Next, before the bottom dead center (at a point $t_2$ in FIG. 12), the fuel is injected by late post-injection. An unburned HC component injected by the late post-injection is oxidized by the catalysis of the diesel oxidation catalyst 50, and the temperature of the exhaust gas e is increased to 600° C. or more by using reaction heat generated in the oxidation.

By increasing the temperature of the exhaust gas e to 600° C. or more, the PM collected in the DPF filter device 52 is burnt and removed from the DPF filter device 52.

When the diesel oxidation catalyst 50 does not reach the activation temperature or more even by performing the early post-injection, the temperature of the diesel oxidation catalyst 50 is increased by throttling of the intake pipe 18 by the throttle valve 44 and changing of early post-injection conditions. As shown in FIG. 12, even when the diesel oxidation catalyst 50 reaches the activation temperature or more, the throttling by the throttle valve 44 and the changing of the early post-injection conditions are continuously performed.

In FIG. 2, there is provided an oil circulation pump 74 in an oil passage 72, and lubricating oil is pumped from an oil pan 70 by the oil circulation pump 74. On the downstream side of the oil circulation pump 74, there is provided a variable throttle mechanism 77 capable of adjusting a throttle opening of the oil passage 72. On the downstream side of the variable throttle mechanism 77, there is provided an oil pressure sensor 78 for detecting an oil pressure of the lubricating oil flowing in the oil passage 72. The variable throttle mechanism 77 and the oil pressure sensor 78 constitute a load increase unit 76.

The lubricating oil flowing in the oil passage 72 passes through an oil filter 80, an oil cooler 82, and the exhaust turbocharger 34, and returns to the oil pan 70. A part of the lubricating oil passes through the cylinder head, a valve mechanism, and sliding portions such as a cam, the piston, a crankshaft, and a gear of the diesel engine 10 from an oil branch passage 84, and returns to the oil pan 70. In addition, a part of the lubricating oil having passed through the exhaust turbocharger 34 reaches the cylinder head and the like of the diesel engine 10 via a breather 86. Note that there are provided a safety valve 88 on the downstream side of the variable throttle mechanism 76, and a relief valve 90 on the downstream side of the oil cooler 82. Further, there is provided an oil temperature sensor 92 for detecting an oil temperature of the lubricating oil stored in the oil pan 70.

In the structure described above, in the present embodiment, the opening of the oil passage 72 is reduced to A % by the variable throttle mechanism 77 at the timing of the start point of the stage of increasing the temperature of the diesel oxidation catalyst $t_1$, as shown in FIG. 3. At the same time, the power of the oil circulation pump 74 is increased such that the oil pressure detected in the oil pressure sensor 78 becomes equal to an oil pressure level $S_1$ detected when the opening of the oil passage 72 is 100%.

With this arrangement, the load of the diesel engine 10 is increased so that the fuel injection quantity supplied to the injector 26 is increased.

As a result, the temperature of the exhaust gas e discharged into the exhaust pipe 20 from the combustion chamber 16 is increased, as indicated by an arrow. Consequently, a temperature rise gradient pattern $X_1$ of the diesel oxidation catalyst 50 at the stage of increasing the temperature of the diesel oxidation catalyst has an increased temperature rise gradient as compared with that of a temperature rise gradient pattern $Y_1$ in a case where the opening of the oil passage 72 is 100%.

In addition, also in a temperature rise gradient pattern of the exhaust gas e passing through the DPF filter device 52, a temperature rise gradient pattern $X_2$ in a case where the opening of the oil passage 72 is subjected to throttling has an increased temperature rise gradient as compared with that of a temperature rise gradient pattern $Y_2$ in a case where the opening is 100%.

Thus, by increasing the load of the diesel engine 10 to increase the temperature rise gradient of the exhaust gas e, the diesel oxidation catalyst 50 reaches the activation temperature early, and hence the fuel injected by the early post-injection is oxidized and combusted at an early stage. As a result, it is possible to significantly reduce the unburned HC component released to the muffler ($Y_3 \rightarrow X_3$).

Note that the throttling in the variable throttle mechanism 77 is not performed during the normal operation of the diesel engine 10 so that a fuel-efficient operation having reduced auxiliary power is made possible.

The forced reconditioning step in the first embodiment is automatically performed by the ECU 32. In contrast to this, even in a case where the forced reconditioning step is performed through a manual operation of the operator when the diesel engine 10 is in a low-load operation state including an idling state or the like, it is possible to effectively reduce the release of the unburned HC component by employing the method of the present invention.

Second Embodiment

Figure 4:
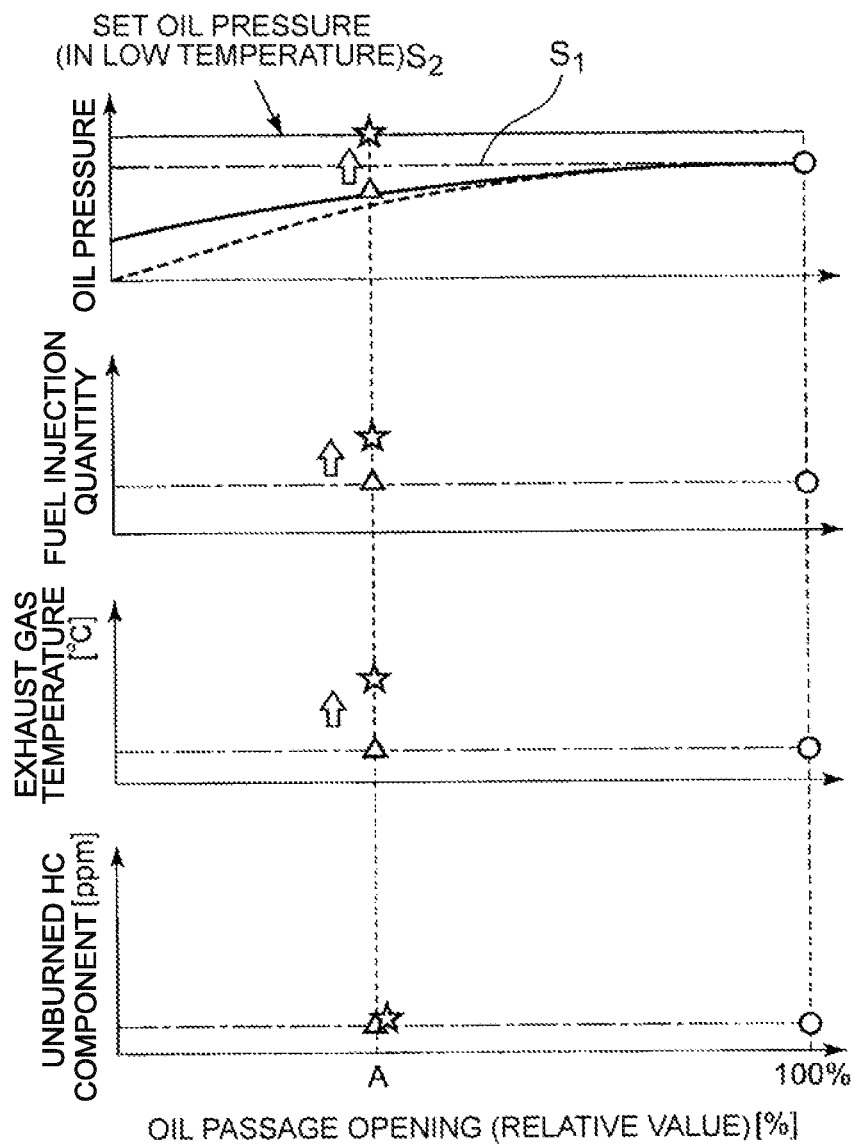
FIG. 4 is a diagram showing the procedure of release suppression of the unburned HC component of a second embodiment of the method and device of the present invention.

Next, a description is given of a second embodiment of the method and device of the present invention on the basis of FIG. 4. The structure of the device of the present embodiment is the same as that of the first embodiment. In the present embodiment, in consideration of the oil temperature of the lubricating oil, the set oil pressure level is increased to a level higher than $S_1$ correspondingly, and the load of the diesel engine 10 is thereby increased.

When the diesel engine 10 is in the low temperature environment, the viscosity of the lubricating oil is increased. Accordingly, unless the oil pressure detected in the oil pressure sensor 78 is increased higher than $S_1$, it is not possible to increase the load of the diesel engine 10. To cope with this, the temperature of the lubricating oil is detected in the oil temperature sensor 92, and the detected value is inputted to the ECU 32. When is is judged that the oil temperature of the lubricating oil is low in the ECU 32, the oil pressure level detected in the oil pressure sensor 78 is set to $S_2$ which is higher than the normal set oil pressure level $S_1$. Subsequently, the load of the diesel engine 10 is increased such that the oil pressure level $S_2$ is achieved. Note that, in a high temperature environment, conversely, the set oil pressure level is set to an oil pressure level lower than $S_1$.

Thus, according to the present embodiment, since the set oil pressure level is changed in accordance with the oil temperature of the lubricating oil, it is possible to properly set the load increase amount of the diesel engine 10. With this arrangement, the temperature rise gradient of the exhaust gas e is increased and the diesel oxidation catalyst 50 reaches the activation temperature early so that it is possible to suppress the release quantity of the unburned HC component at the stage of increasing the temperature of the diesel oxidation catalyst.

Third Embodiment

Figure 5:
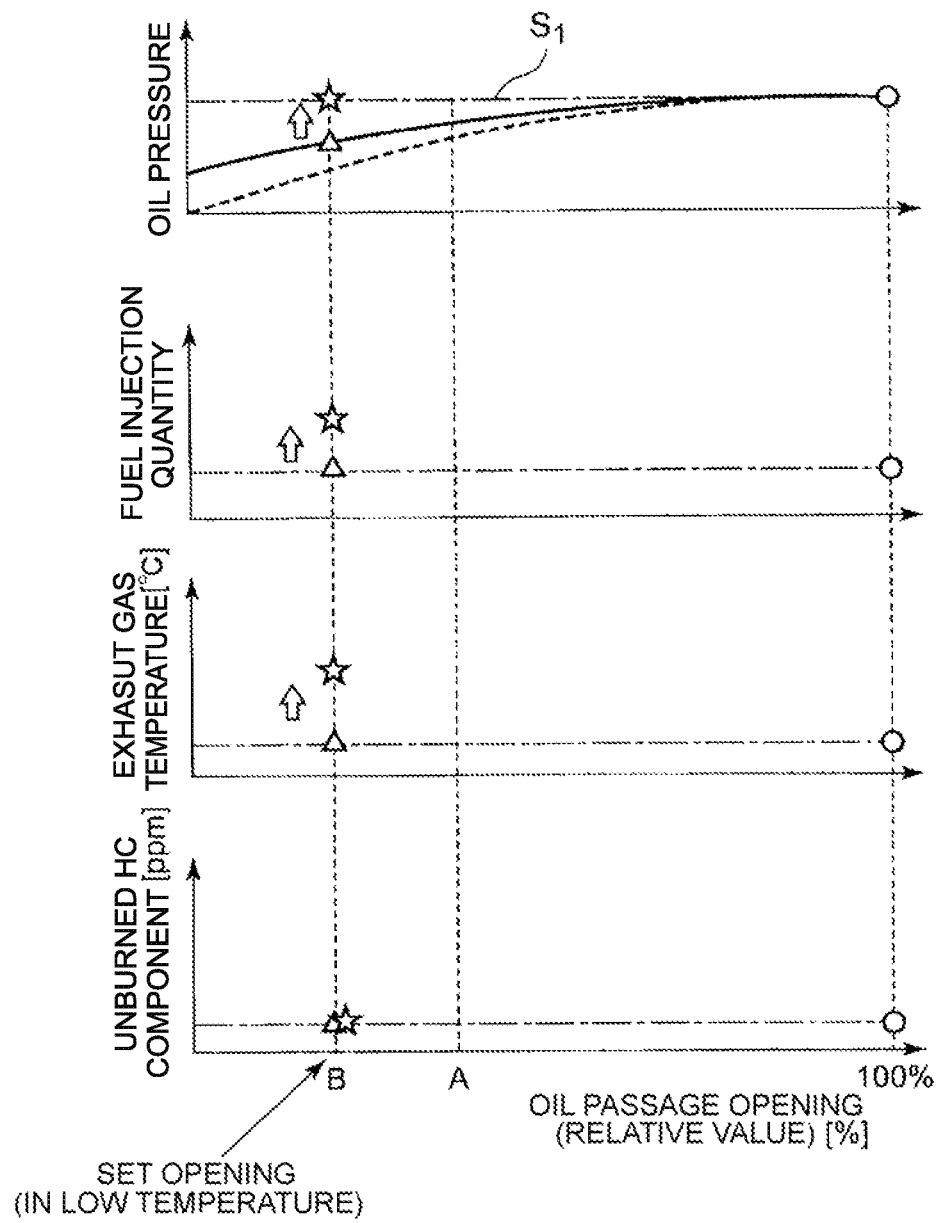
FIG. 5 is a diagram showing the procedure of release suppression of the unburned HC component according to a third embodiment of the method and device of the present invention.

Next, a description is given of a third embodiment of the method and device of the present invention on the basis of FIG. 5. In the present embodiment, when the diesel engine 10 is in the low temperature environment, the temperature of the lubricating oil is detected in the oil temperature sensor 92 and, in a case where the detected value is low, the throttle opening of the variable throttle mechanism 76 is set to B % lower than A %. Based on the throttle opening, the load of the diesel engine 10 is increased such that the oil pressure detected in the oil pressure sensor 78 becomes equal to the set oil pressure level $S_1$. With this arrangement, it is possible to properly increase the load of the diesel engine 10.

Note that, in the high temperature environment, conversely, by setting the throttle opening of the variable throttle mechanism 76 to the throttle opening higher than A %, it is possible to properly set the load of the diesel engine 10.

According to the present embodiment, since the throttle opening of the variable throttle mechanism 76 is changed in accordance with the oil temperature of the lubricating oil, similarly to the second embodiment, it is possible to properly set the load increase amount of the diesel engine 10. As a result, it is possible to suppress the release quantity of the unburned HC component at the stage of increasing the temperature of the diesel oxidation catalyst.

Fourth Embodiment

Figure 6:
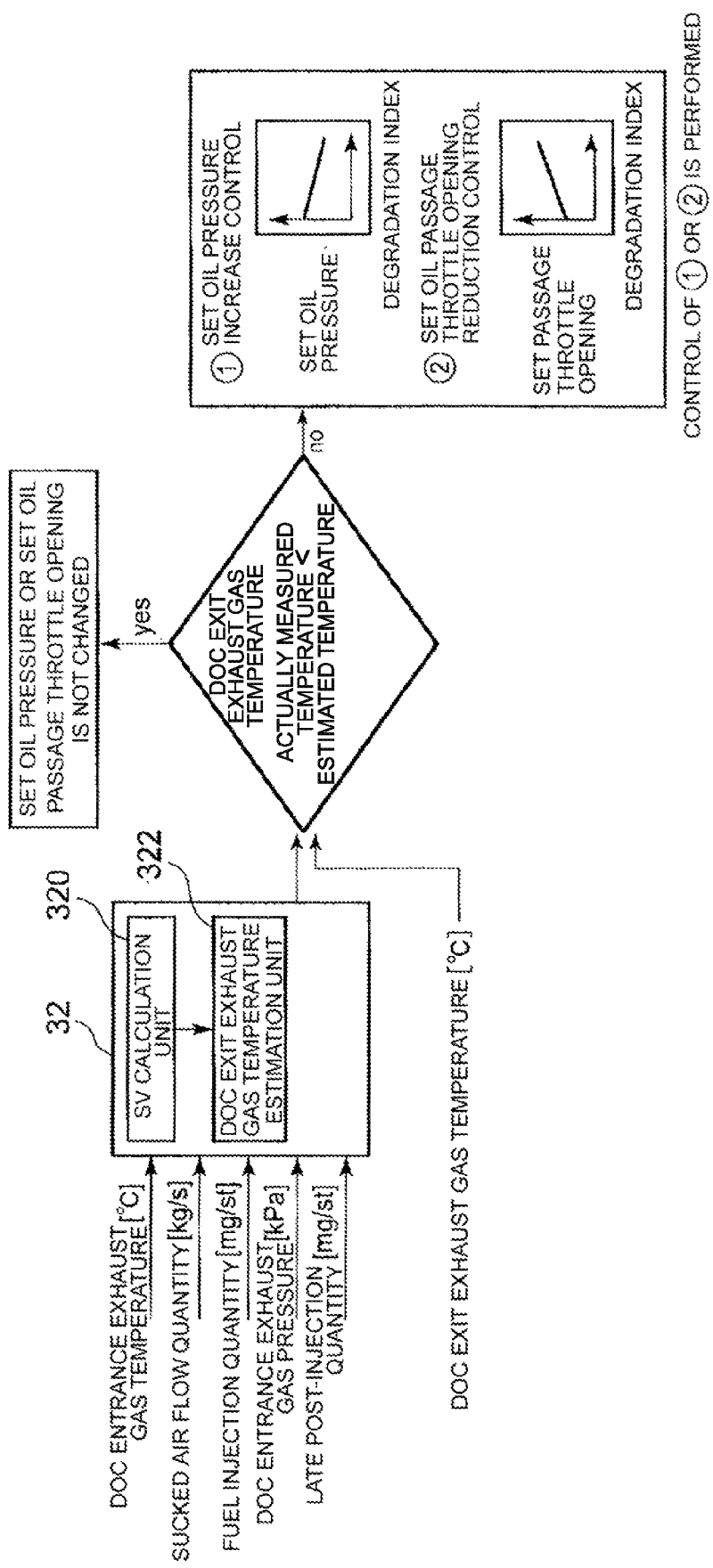
FIG. 6 is a flowchart showing the procedure of release suppression of the unburned HC component according to a fourth embodiment of the method and device of the present invention.

Next, a description is given of a fourth embodiment of the method and device of the present invention on the basis of FIG. 6. In the diesel oxidation catalyst 50, the oxidation function is reduced due to aging degradation so that the function of increasing the temperature of the exhaust gas e is reduced. Consequently, in consideration of the aging degradation of the diesel oxidation catalyst 50, the load of the diesel engine 10 needs to be increased.

As shown in FIG. 6, in the present embodiment, an entrance exhaust gas temperature of the diesel oxidation catalyst 50 in the current operation state is detected in the exhaust gas temperature sensor 54. Subsequently, in an SV calculation unit 320 of the ECU 32, from the DOC entrance exhaust gas temperature, the sucked air flow quantity detected in the temperature sucked air flow quantity meter 68, the fuel injection quantity including the late post-injection quantity, and an entrance exhaust gas pressure of the diesel oxidation catalyst 50 detected in the exhaust gas pressure sensor 59, a space velocity SV (SV=exhaust gas flow quantity $(m^3/h)$/filled diesel oxidation catalyst volume $(m^3)$) of the exhaust gas e flowing in the exhaust pipe 20 is determined.

Then, in a DOC exit exhaust gas temperature estimation unit 322, an exit exhaust gas temperature of the diesel oxidation catalyst 50 is estimated from the SV value determined in the SV calculation unit 320 and a reaction rate of the diesel oxidation catalyst 50. As described above, from the SV value and the reaction rate of the diesel oxidation catalyst 50 before the degradation, the exhaust gas temperature on the downstream side of the diesel oxidation catalyst 50 can be estimated and, by comparing the estimated temperature with the actually measured temperature, the aging degradation degree of the diesel oxidation catalyst 50 can be judged.

The estimated temperature estimated in the DOC exit exhaust gas temperature estimation unit 322 and the actually measured value of the exit exhaust gas temperature of the diesel oxidation catalyst 50 detected in the exhaust gas temperature sensor 56 are compared in a comparator which is not shown. When the estimated temperature is higher than the actually measured temperature, it is found that the diesel oxidation catalyst 50 undergoes the aging degradation, and it is possible to judge the aging degradation degree by the difference therebetween. When it is found that the diesel oxidation catalyst 50 is degraded, by the ECU 32, the set value of the oil pressure level detected in the oil pressure sensor 78 is increased, or the throttle opening of the oil passage 72 of the variable throttle mechanism 77 is reduced.

With this arrangement, the power of the oil circulation pump 74 is increased and the load of the diesel engine 10 is also increased so that the fuel injection quantity supplied to the injector 26 is increased. As a result, the temperature of the exhaust gas e discharged from the combustion chamber 16 into the exhaust pipe 20 rises, and the diesel oxidation catalyst 50 reaches the activation temperature early at the stage of increasing the temperature of the diesel oxidation catalyst. Note that, when the estimated temperature is equal to the actually measured temperature, it is judged that the diesel oxidation catalyst 50 does not undergo the aging degradation, and the set value of the oil pressure level or the throttle opening of the oil passage 72 is not changed.

Consequently, even when the diesel oxidation catalyst 50 is degraded, it is possible to suppress the unburned HC component released into the muffler.

According to the present embodiment, by adjusting the load increase amount of the diesel engine 10 in accordance with the aging degradation degree of the diesel oxidation catalyst 50, it is possible to set the entrance exhaust gas temperature of the diesel oxidation catalyst 50 to a temperature corresponding to the aging degradation degree. Consequently, even when the diesel oxidation catalyst 50 undergoes the aging degradation, it is possible to suppress the release quantity of the unburned HC component at the stage of increasing the temperature of the diesel oxidation catalyst.

Fifth Embodiment

Figure 7:
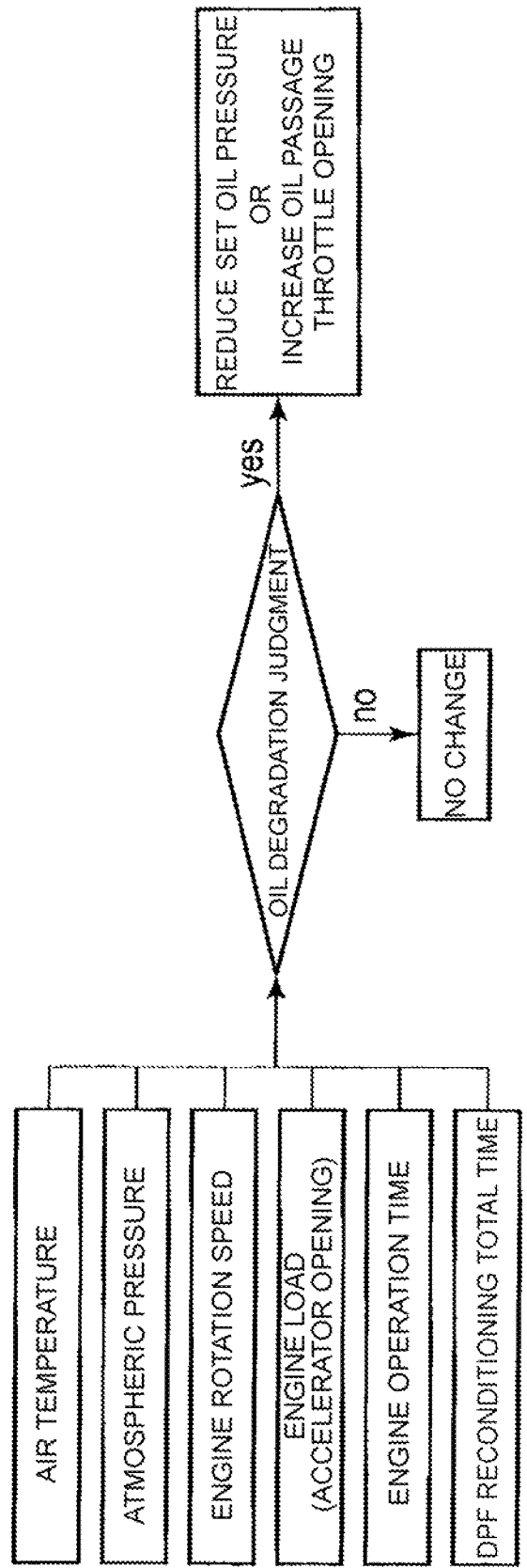
FIG. 7 is a flowchart showing the procedure of release suppression of the unburned HC component according to a fifth embodiment of the method and device of the present invention.
Figure 8:
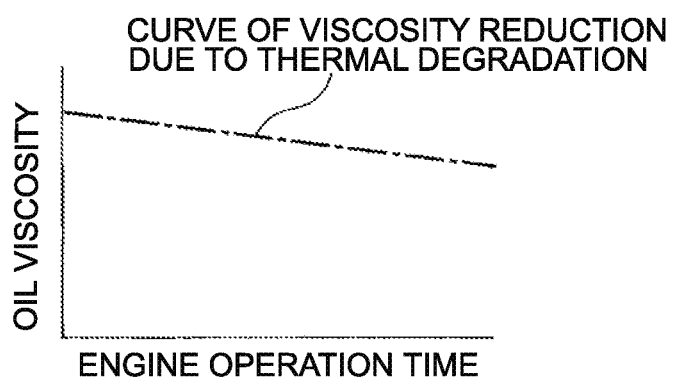
FIG. 8 is a diagram showing a reduction in viscosity due to thermal degradation of the lubricating oil.
Figure 9:
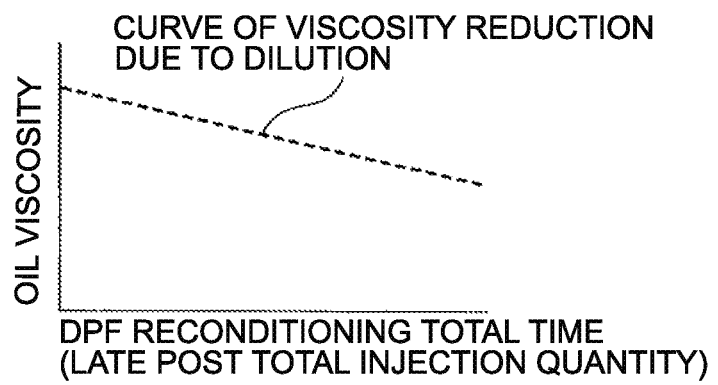
FIG. 9 is a diagram showing a reduction in viscosity due to dilution of the lubricating oil.

Next, a description is given of a fifth embodiment of the method and device of the present invention on the basis of FIGS. 7 to 9. As described above, when the oil dilution progresses by the post-injection or the like, or when the thermal degradation of the lubricating oil progresses, the viscosity of the lubricating oil is reduced. Accordingly, the oil pressure level detected in the oil pressure sensor 78 is reduced. Consequently, in order to increase the oil pressure level, the load of the diesel engine 10 may be uselessly increased. In the present embodiment, in order to solve the inconvenience, the degradation degree of the lubricating oil is judged, and the set oil pressure level or the throttle opening of the variable throttle mechanism 76 is adjusted in accordance with the degradation degree of the lubricating oil.

As shown in FIG. 7, in the present embodiment, from an atmospheric pressure and an air temperature around the diesel engine, and a rotation speed, a load (accelerator opening), and an operation time of the diesel engine 10, and a reconditioning step total time of the DPF filter device 52, the degradation degree of the lubricating oil is judged. As shown in FIG. 8, the reduction in the viscosity of the lubricating oil is correlated with the operation time of the diesel engine 10. In addition, as shown in FIG. 9, the reduction in the viscosity of the lubricating oil due to the dilution is correlated with the reconditioning step total time of the DPF filter device 52. Consequently, it is possible to judge the degradation degree of the lubricating oil using the above-mentioned parameters.

From the judged degradation degree, when it is found that the lubricating oil is not degraded, the set oil pressure level or the throttle opening of the variable throttle mechanism 76 is not adjusted. When it is found that the lubricating oil is degraded, in accordance with the degradation degree, the set oil pressure level is reduced, or the throttle opening of the variable throttle mechanism 76 is increased.

With this arrangement, the load of the diesel engine 10 is not excessively increased so that it is possible to properly maintain the entrance exhaust gas temperature of the diesel oxidation catalyst 50, and suppress the release of the unburned HC component at the stage of increasing the temperature of the diesel oxidation catalyst. In addition, the fuel-efficient operation of the diesel engine 10 is made possible.

Sixth Embodiment

Figure 10:
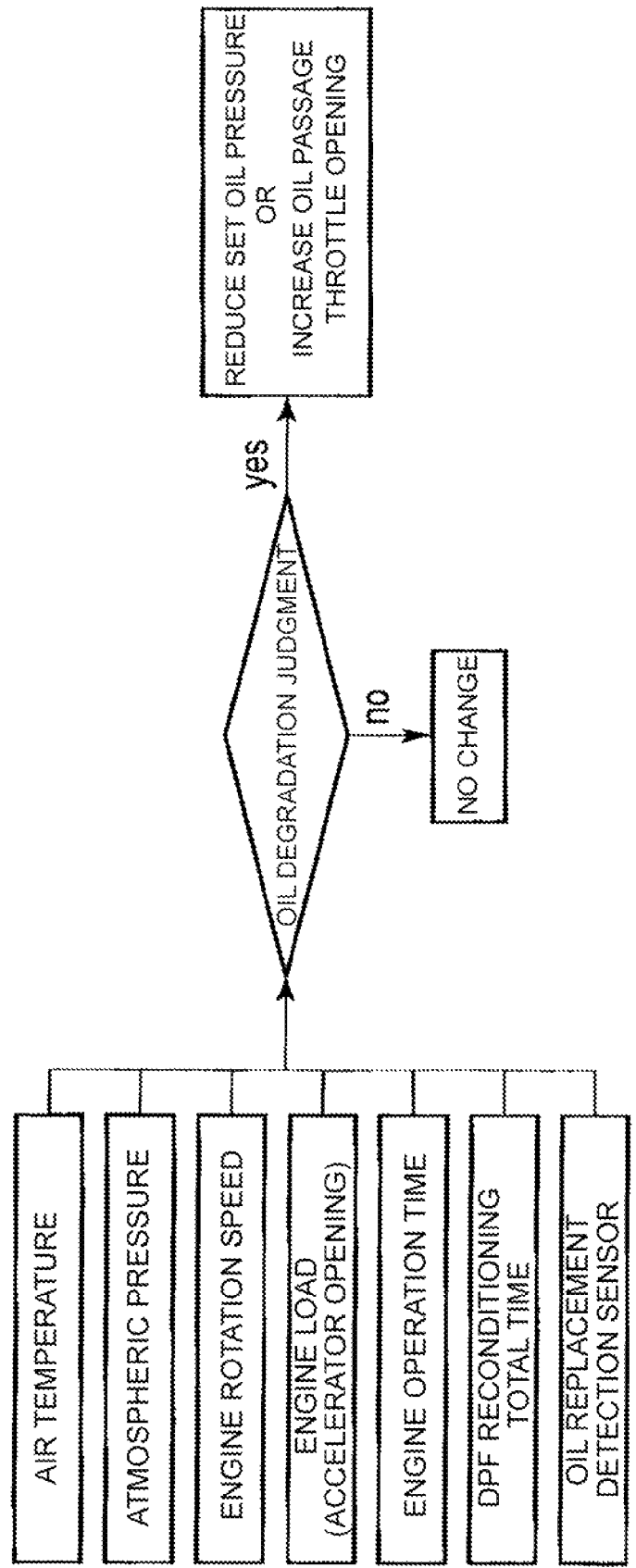
FIG. 10 is a flowchart showing the procedure of release suppression of the unburned HC component according to a sixth embodiment of the method and device of the present invention.

Next, a description is given of a sixth embodiment of the method and device of the present invention on the basis of FIG. 10. The lubricating oil is periodically replaced, whereby the degradation degree thereof is reset, and a fresh lubricating oil without degradation is provided. In the present embodiment, a replacement timing of the lubricating oil is further added to the parameters used in the fifth embodiment. That is, there is provided a sensor for detecting the replacement timing of the lubricating oil, and consideration is given to the replacement timing of the lubricating oil at the time of the judgment of the degradation degree of the lubricating oil.

The sensor described above may also be, e.g., a sensor for detecting opening or closing of a lid of the oil pan 70 shown in FIG. 2. By detecting the opening or closing of the lid performed at the time of replacement of the lubricating oil using the sensor, the replacement timing of the lubricating oil is detected.

According to the present embodiment, in addition to the operation and effect obtained in the fifth embodiment, by considering the replacement timing of the lubricating oil, it is possible to judge the degradation degree of the lubricating oil more precisely. As a result, it is possible to properly increase the exhaust gas temperature at the stage of increasing the temperature of the diesel oxidation catalyst to suppress the release of the unburned HC component.

According to the present invention, in the internal combustion engine, especially the diesel engine, it is possible to reduce the release of the unburned HC component at the stage of increasing the temperature of the diesel oxidation catalyst to allow further purification of the exhaust gas and solve environmental pollution.

The invention claimed is:

1. An exhaust gas treatment device for an internal combustion engine which comprises a diesel oxidation catalyst and a filter in an exhaust gas passage of the internal combustion engine, the exhaust gas treatment device being configured to collect particulate matter in exhaust gas by the filter, and perform post-injection of fuel to heat the exhaust gas to a combustion temperature of the particulate matter in the diesel oxidation catalyst, and then burn and remove the particulate matter collected in the filter by using the heated exhaust gas, the exhaust gas treatment device comprising:
a load increase unit configured to increase auxiliary power to increase a load of the internal combustion engine, the load increase unit including a variable throttle mechanism provided in a lubricating oil passage of the internal combustion engine and an oil pressure sensor provided in the lubricating oil passage on a downstream side of the variable throttle mechanism;
an electronic control unit configured to control the load increase unit; and
an oil temperature sensor configured to detect a temperature of the lubricating oil in the lubricating oil passage, wherein:
the electronic control unit is configured to increase power of a lubricating oil circulation pump so as to maintain an oil pressure level detected by the oil pressure sensor at a level not less than a set value while reducing an opening of the lubricating oil passage using the variable throttle mechanism to increase a flow resistance of a lubricating oil, and the electronic control unit is configured to change the set value of the oil pressure level in accordance with a temperature detected by the oil temperature sensor, or adjust a throttle opening of the variable throttle mechanism in accordance with the temperature detected by the oil temperature sensor, whereby the electronic control unit is configured to increase the auxiliary power before a start of the post-injection.

2. The exhaust gas treatment device for an internal combustion engine according to claim 1, wherein the set value of the oil pressure level is maintained at an oil pressure level when the opening of the lubricating oil passage is not reduced.

3. The exhaust gas treatment device for an internal combustion engine according to claim 1, wherein
the electronic control unit is configured to determine a space velocity of the exhaust gas passing through the diesel oxidation catalyst, estimate an exit exhaust gas temperature of the diesel oxidation catalyst from the space velocity and a reaction rate of the diesel oxidation catalyst, and compare an estimated value with the exit exhaust gas temperature to determine a degradation degree of the diesel oxidation catalyst.

4. The exhaust gas treatment device for an internal combustion engine according to claim 1, wherein
the electronic control unit is configured to judge a degradation degree of the lubricating oil from an air temperature, an atmospheric pressure, a rotation speed, a load, and an operation time of the internal combustion engine, and a total time spent on the burning and removing of the particulate matter collected in the filter, and is configured to increase the power of the lubricating oil circulation pump in accordance with the judged degradation degree of the lubricating oil.

5. The exhaust gas treatment device for an internal combustion engine according to claim 4, further comprising a sensor which configured to detect a replacement timing of the lubricating oil, wherein
the electronic control unit is configured to reset the degradation degree of the lubricating oil when the replacement timing of the lubricating oil is detected by the sensor.

6. An exhaust gas treatment method for an internal combustion engine comprising a collection step of collecting particulate matter in exhaust gas exhausted from the internal combustion engine by using a filter, and a forced reconditioning step of performing post-injection of fuel to heat the exhaust gas to a combustion temperature of the particulate matter in a diesel oxidation catalyst and then burning and removing the particulate matter collected in the filter by using the heated exhaust gas,
the method further comprising:
a load increase step of increasing auxiliary power to increase a load of the internal combustion engine before a start of the forced reconditioning step; and
an exhaust gas temperature increase step of increasing a temperature rise gradient of the exhaust gas in the forced reconditioning step by using the increased load in order to reduce a quantity of an unburned hydrocarbon released until the diesel oxidation catalyst reaches an activation temperature, wherein:
the load increase step increases a flow resistance of a lubricating oil by providing a variable throttle mechanism in a lubricating oil passage of the internal combustion engine and by reducing an opening of the lubricating oil passage using the variable throttle mechanism, and increases power of a lubricating oil circulation pump so as to maintain an oil pressure level in the lubricating oil passage on a downstream side of the variable throttle mechanism at a level not less than a set valve, and the load increase step changes the set value of the oil pressure level in accordance with an oil temperature of the lubricating oil detected by an oil temperature sensor in the lubricating oil passage, or adjusts a throttle opening of the variable throttle mechanism in accordance with the detected oil temperature of the lubricating oil in the lubricating oil passage, whereby the load increase step increases the auxiliary power before the start of the forced reconditioning step.

7. The exhaust gas treatment method for an internal combustion engine according to claim 6, wherein the forced reconditioning step is performed through a manual operation when the internal combustion engine is in a low-load operation state including an idling state.

* * * * *